(12) United States Patent
Zhang

(10) Patent No.: US 7,920,532 B2
(45) Date of Patent: Apr. 5, 2011

(54) METHOD AND APPARATUS FOR PROVIDING DISTRIBUTED SERVICE COMPOSITION MODEL FOR AD HOC NETWORKS

(75) Inventor: Qing Zhang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 388 days.

(21) Appl. No.: 11/650,496

(22) Filed: Jan. 8, 2007

(65) Prior Publication Data

US 2007/0165544 A1    Jul. 19, 2007

Related U.S. Application Data

(60) Provisional application No. 60/759,059, filed on Jan. 17, 2006.

(30) Foreign Application Priority Data

Jun. 9, 2006    (KR) ........................ 10-2006-0052220

(51) Int. Cl.
*H04W 4/00*    (2009.01)
(52) U.S. Cl. .................... 370/338; 370/310.2; 370/328; 455/445
(58) Field of Classification Search .................. 370/338, 370/351, 237, 238, 328, 310.2; 455/445, 455/422.1–460, 524, 525
See application file for complete search history.

(56) References Cited

U.S. PATENT DOCUMENTS

| | | | | |
|---|---|---|---|---|
| 5,519,704 A | * | 5/1996 | Farinacci et al. | 370/402 |
| 5,931,954 A | * | 8/1999 | Hoshina et al. | 714/15 |
| 6,836,463 B2 | * | 12/2004 | Garcia-Luna-Aceves et al. | 370/238 |
| 6,940,832 B2 | * | 9/2005 | Saadawi et al. | 370/328 |
| 2004/0258007 A1 | * | 12/2004 | Nam et al. | 370/310 |

FOREIGN PATENT DOCUMENTS

| | | |
|---|---|---|
| EP | 1517488 A2 | 3/2005 |
| JP | 2005-236752 A | 9/2005 |
| KR | 2003-0002567 A | 1/2003 |
| KR | 10-2003-0088203 A | 11/2003 |
| KR | 10-2004-0046688 A | 6/2004 |
| KR | 10-2005-0029340 A | 3/2005 |
| KR | 10-2005-0050457 A | 5/2005 |
| KR | 10-2005-0103043 A | 10/2005 |
| KR | 10-2006-0031330 A | 4/2006 |

* cited by examiner

*Primary Examiner* — Kent Chang
*Assistant Examiner* — San Htun
(74) *Attorney, Agent, or Firm* — Sughrue Mion, PLLC

(57) ABSTRACT

A method and apparatus for providing a distributed service composition model in accordance with the characteristics of an ad hoc network are provided. The method includes confirming whether an adjacent mobile node exists within a number of hops from a task initiator node so as to execute a task, establishing a flow for executing the task with regard to the adjacent mobile node if it is confirmed that the adjacent mobile node exists, and executing the task using a routing algorithm in accordance with the flow. At least one service necessary to execute the task and an execution order between services are determined based on cooperation between adjacent mobile nodes.

14 Claims, 7 Drawing Sheets

METHOD AND APPARATUS FOR PROVIDING DISTRIBUTED SERVICE COMPOSITION MODEL FOR AD HOC NETWORKS

CROSS-REFERENCE TO RELATED APPLICATION

This application claims priority from Korean Patent Application No. 10-2006-0052220 filed on Jun. 9, 2006 in the Korean Intellectual Property Office, and U.S. Provisional Patent Application No. 60/759,059 filed on Jan. 17, 2006 in the United States Patent and Trademark Office, the disclosures of which are incorporated herein by reference in their entirety

BACKGROUND OF THE INVENTION

1. Field of the Invention

Methods and apparatuses consistent with the present invention relate to a service composition technology for ad hoc networks, and more particularly, to providing a distributed service composition model in accordance with the characteristics of an ad hoc network.

2. Description of the Related Art

As generally known in the art, service composition refers to a tool for creating new services by using existing services. Compared to the related art infrastructure-based environments, mobile ad hoc networks have been recently spotlighted as a new type of communication paradigm in line with developments in mobile devices and wireless communication technologies.

In the case of an infrastructure-based network, a number of terminal nodes are connected to a single hub and constitute a network. The hub may be regarded as a type of repeater or base station, and Internet Protocol version 4 (IPv4) can be the only protocol used in the hub.

In contrast, an ad hoc network includes at least two devices which have wireless communication and networking abilities. Each node constituting the ad hoc network can communication with another node, which belongs to the same network, even when the latter is not within range of its own radio waves. Accordingly, intermediate nodes forward or relay packets used for data communication between source and destination nodes.

As the term "ad hoc" implies, ad hoc networks are characterized in that they are self-organized, i.e., they can consist solely of mobile devices with no separate infrastructure. In addition, they are adaptive to any type of change. More particularly, nodes alone can constitute an ad hoc network and identify other nodes in the network with no separate system administration. In contrast to related art networks, ad hoc networks need no infrastructure, including base stations, wires or cables, and routers or bridges.

Ad hoc networks are also characterized in that they may consist of different types of devices. Particularly, an ad hoc network may employ the same ad hoc communication protocol for communication between different types of devices (e.g. laptop computers, PDAs, and Internet mobile telephones).

However, the current service composition technology is, from certain points of view, unsuitable for ad hoc network-based environments. This means that the majority of service composition technologies have been developed for infrastructure-based environments, and little effort has been made to compose services in ad hoc environments.

FIG. 1 shows a service composition architecture in an infrastructure-based network. Referring to FIG. 1, n nodes 10, 20, 30, and 40 capable of executing services S1, S2, S3, . . . , Sn allocated thereto, respectively, are connected to a broker/mediator 50, which acts as a type of repeater. Typical examples of the service composition technology for an infrastructure-based network include a ninja scalable Internet service architecture (hereinafter, referred to as "ninja architecture") and an eFlow service composition engine (hereinafter, referred to as "eFlow architecture"). As a representative service composition technology in an ad hoc network, an anamika distributed service discovery and composition system (hereinafter, referred to as "anamika") has been introduced in the industry.

The ninja architecture plugs into a network service, which has been maintaining its original state, in order to access a fixed network service, not modify existing network services. The key element of the ninja architecture is an Automatic Patch Creation (APC) service, which is executed by a set of operators and connectors, in order to create a logical path and discover a physical service necessary to execute a task.

The eFlow architecture provides a platform for integrating different types of e-services and utilizing respective functions which constitute various kinds of electronic commerce. The eFlow architecture consists of three elements: elementary e-services, a service discovery broker, and an eFlow composition engine. The service discovery broker is adapted to discover an electronic service corresponding to a service node required by the eFlow composition engine, which contains information regarding the condition of all composite service instances.

The service composition technology in infrastructure-based environments mainly relies on a centralized composition engine in order to discover, integrate, and compose a web-based e-service. For example, the APC service of the ninja architecture and the eFlow composition engine of the eFlow architecture act as the centralized composition engine. Such a centralized architecture system is more suitable for service composition in an infrastructure-based environment. This is because the centralized architecture system is established in a fixed network, which holds information regarding the entire environment and is irrelevant to the physical position of the service. As such, the centralized architecture system is unsuitable for service composition in ad hoc network environments.

FIG. 2 shows an anamika service composition architecture in an ad hoc network. The anamika architecture shown in FIG. 2 is structured in such a manner that a service composition layer 70a and a service execution layer 70b are positioned between a network layer 90 and an application layer 60. The service composition layer 70a has a broker mediation and deputy module 71a, and the service execution module 70b has a fault recovery module 71b.

It can be said that the anamika architecture is a distributed, fault-resistant architecture designed for interactive service composition in ad hoc networks. Two types of interactive technologies have been introduced in order to perform service composition in dynamic ad hoc environments: dynamic brokerage selection and distributed brokerage techniques, both of which are performed by the broker mediation and deputy module 71a. The fault recovery module 71b compensates for faults that occur while a service is executed. In the anamika architecture, any device can act as a broker as long as it participates in service composition, and the selected broker is in charge of the overall composition process regarding a request.

However, there is a limitation on the ability of a mobile node in an ad hoc network environment, and the task execution mode is not predetermined, but it depends on the situation. This means that the selected broker, which is in charge of the overall composition process, is overloaded.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for providing a distributed service composition model for a wireless ad hoc network environment by using a routing algorithm.

According to an aspect of the invention, there is provided a method of providing a distributed service composition model for service composition in an ad hoc network consisting of n mobile networks, the method including confirming whether an adjacent mobile node exists within a predetermined number of hops from a task initiator node so as to execute a task requested by a user, establishing a flow for executing the task with regard to the adjacent mobile node when it has been confirmed that the adjacent mobile node exists, executing the task by using a routing algorithm in accordance with the flow, wherein at least one service necessary to execute the task and an execution order between services are determined based on cooperation between adjacent mobile nodes.

According to another aspect of the present invention, there is provided an apparatus for providing a distributed service composition model for service composition in an ad hoc network consisting of n mobile networks, the apparatus including an adjacent node check module which confirms whether an adjacent mobile node exists within a predetermined number of hops from a task initiator node so as to execute a task requested by a user, a flow setup module which establishes a flow for executing the task with regard to the adjacent mobile node when it has been confirmed that the adjacent mobile node exists, and a task execution module which executes the task by using a routing algorithm in accordance with the flow, wherein at least one service necessary to execute the task and an execution order between services are determined based on cooperation between adjacent mobile nodes.

BRIEF DESCRIPTION OF THE DRAWINGS

The above and other aspects of the present invention will be more apparent from the following detailed description of exemplary embodiments taken in conjunction with the accompanying drawings, in which.

DETAILED DESCRIPTION OF EXEMPLARY EMBODIMENTS OF THE INVENTION

Figure 1:
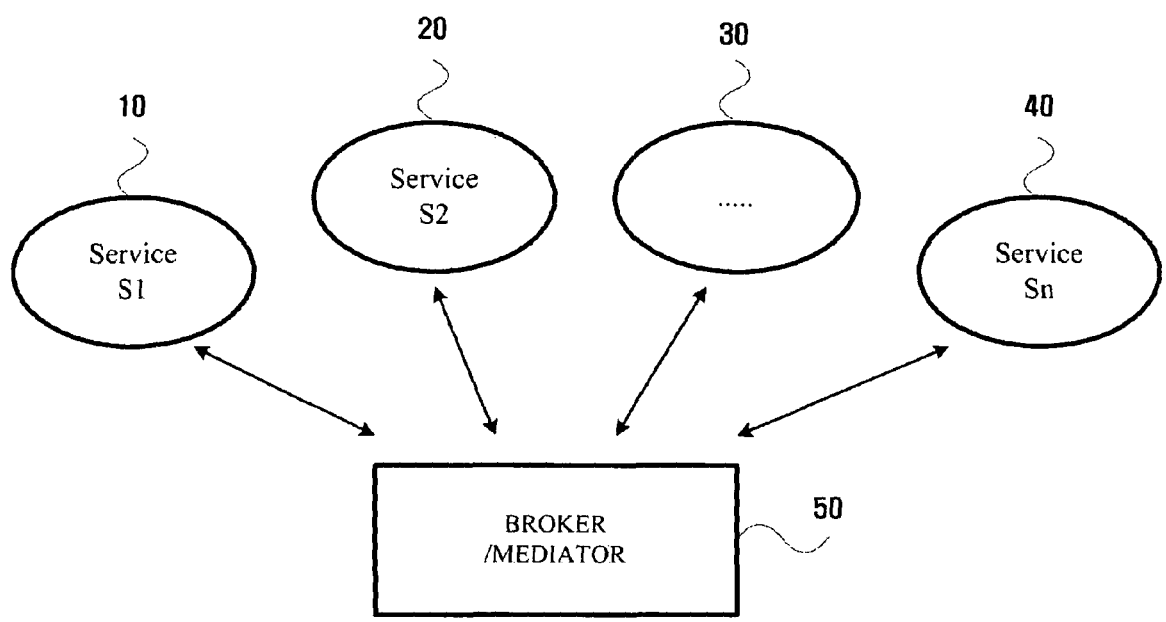
FIG. 1 shows a service composition architecture in an infrastructure-based network.
Figure 2:
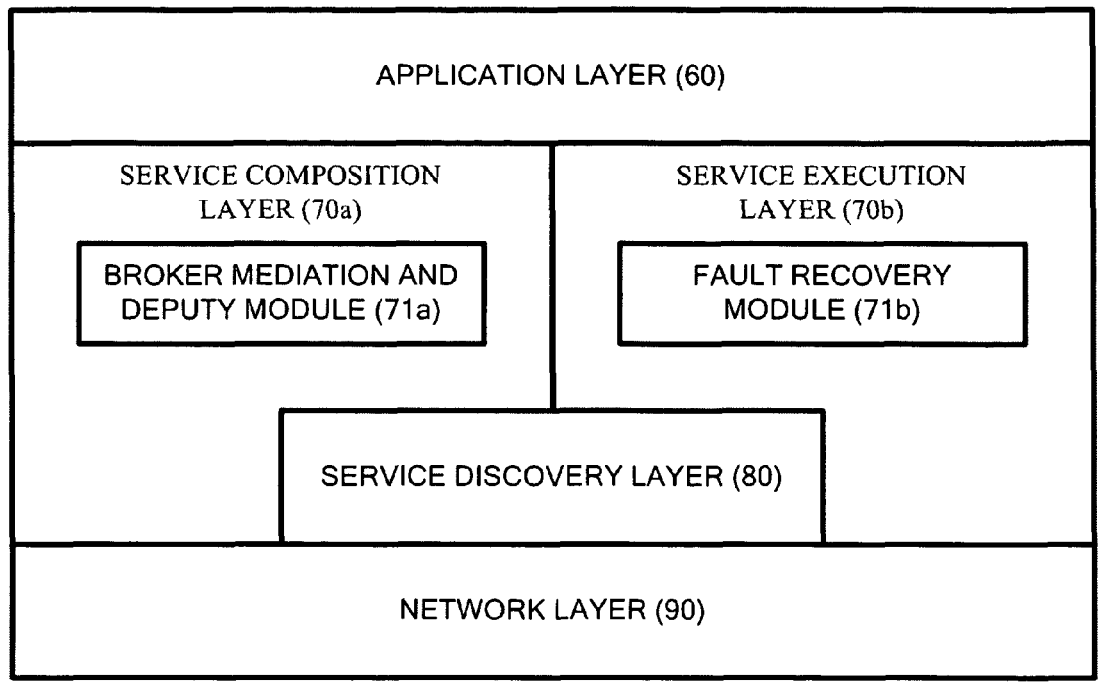
FIG. 2 shows an anamika service composition architecture in an ad hoc network.

Hereinafter, exemplary embodiments of the present invention will be described with reference to the accompanying drawings. The matters defined in the description such as a detailed construction and elements are nothing but the ones provided to assist in a comprehensive understanding of the invention. Thus, it is apparent that the present invention can be carried out without those defined matter. In the following description of the present invention, the same drawing reference numerals are used for the same elements even in different drawings. Also, a detailed description of known functions and configurations incorporated herein will be omitted when it may make the subject matter of the present invention rather unclear.

According to an exemplary embodiment of the present invention, a distributed network is used in order to deal with the service composition problem in an ad hoc network. It can be said that the ad hoc network is a distributed dynamic network, and none of its mobile nodes acts as a broker, which holds information regarding the entire network and has authority to discover services and execute tasks. Basic definitions necessary to describe a structure according to an exemplary embodiment of the present invention will now be introduced.

A service S is defined by a set <ID, I, O, F, C>, where ID refers to a unique identifier (ID) of the service S; I refers to an input pattern of the service S, and an input i matching the input pattern I is used as an input of the service S; O refers to an output pattern of the service S, and an output o matching the output pattern O is used as an output of the service S; F refers to a function provided by the service S, and the input i can be converted into the output o by the function F; and C refers to a cost necessary to execute the service S.

Assume that two services $S_1=<ID_1, I_1, O_1, F_1, C_1>$ and $S_2=<ID_2, I_2, O_2, F_2, C_2>$ are given. If a mobile node in which the service $S_1$ is positioned is spaced from a mobile node in which the service $S_2$ is positioned by k hops, the service $S_1$ and the service $S_2$ are said to be adjacent to each other by k hops.

Assume that two services $S_1=<ID_1, I_1, O_1, F_1, C_1>$ and $S_2=<ID_2, I_2, O_2, F_2, C_2>$ are adjacent to each other by k hops, and output $o_1$ is an output of the service $S_1$. If the whole or a part of the output $o_1$ can be used as an input of the service $S_2$, it is said that the service $S_1$ and the service $S_2$ can be "completely" composed within k hops. This can be expressed by using an arrow as: $S_1 \xrightarrow{k} S_2$.

Assume that two services $S_1=<ID_1, I_1, O_1, F_1, C_1>$ and $S_2=<ID_2, I_2, O_2, F_2, C_2>$ are adjacent to each other by k hops, and output $o_1$ is an output of the service $S_1$. If the whole or a part of the output $o_1$ can be used as a part of an input of the service $S_2$, it is said that the service $S_1$ and the service $S_2$ can be "partially" composed within k hops. This can be expressed by using a semi-arrow as: $S_1 \xrightharpoonup{k} S_2$.

If two services $S_1$ and $S_2$ can be composed completely or partially, as mentioned above, it is said that both $S_1$ and $S_2$ can be composed together.

Assume that two services $S_1=<ID_1, I_1, O_1, F_1, C_1>$ and $S_2=<ID_2, I_2, O_2, F_2, C_2>$ are given. If both services $S_1$ and $S_2$ can be executed without affecting each other, it is said that they are independent on each other. This can be expressed as: $S_1\|S_2$.

Figure 3:
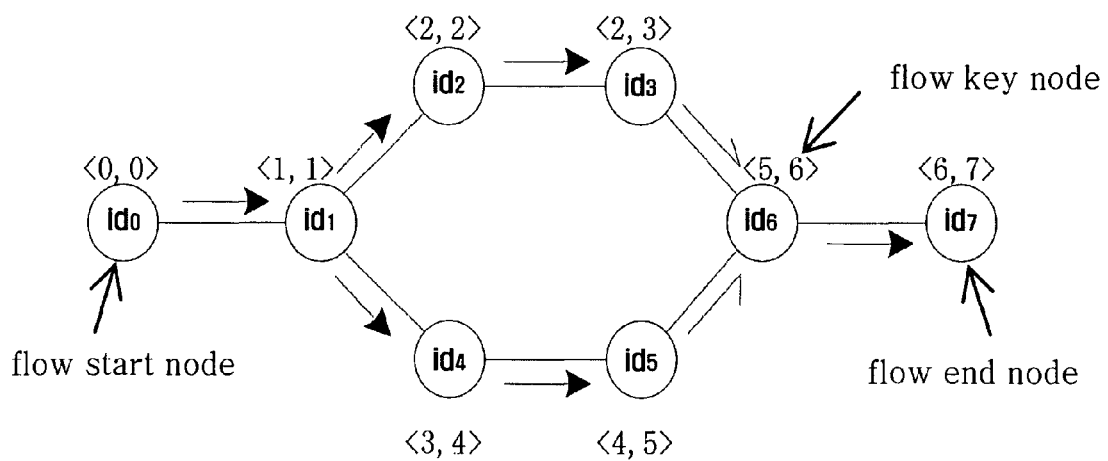
FIG. 3 shows a distributed service composition model for an ad hoc network according to an exemplary embodiment of the present invention.

A decentralized service composition model in an ad hoc network according to an exemplary embodiment of the present invention will now be described with reference to FIG. 3, which shows a distributed service composition model for an ad hoc network according to an exemplary embodiment of the present invention. The service composition flow in FIG. 3 is realized as a Directed Acyclic Graph (DAG) consisting of mobile nodes and paths. Each flow node is expressed as a pair <node, service>.

Assume that, in a dynamic ad hoc environment, there are 8 mobile nodes having unique IDs, $id_0$-$id_7$. A node $id_m$ has a total of $p_m$ services $S_{m,1}$-$S_{m,pm}$. The node $id_m$ is solely aware of services provided by its own node, as well as those provided by nodes within k hops. When the task initiator node $id_0$ is to execute task t, it must determine a flow for completing the task t beforehand. The period of time necessary to determine the flow must be shorter than a predetermined time T.

Each of eight mobile nodes is solely aware of itself, as well as nodes within k hops from itself. There is no broker playing a core role. All that are necessary for each task t are just an input i and an output pattern O. Services necessary to complete the task t and their order are solely determined based on cooperation between respective nodes.

The DAG shown in FIG. 3 starts from a flow start node, $id_0$ capable of receiving a task input and ends at a flow end node, $id_7$ adapted to create an output suitable for a desirable task output pattern. A node adapted to receive at least two inputs is referred to as a flow key node, which composes a single service from a combination of at least two services. A route from a flow node to a next node will hereinafter be referred to as a path. A flow may be expressed as a combination of a number of paths.

Considering the fact that the output from the node $id_0$ is inputted to the adjacent node $id_1$, both nodes $id_o$ and $id_1$ are said to be completely composed, as mentioned above. In a similar manner, nodes $id_1$ and $id_2$, nodes $id_2$ and $id_3$, nodes $id_1$ and $id_4$, nodes $id_4$ and $id_5$, and nodes $id_6$ and $id_7$, all of which have a full-headed arrow between them as shown in FIG. 3, respectively, are said to be completely composed. In addition, nodes $id_3$ and $id_6$ and nodes $id_5$ and $id_6$, which have a semi-headed arrow between them, respectively, are said to be partially composed. The node $id_6$, which partially receives inputs from two nodes, is referred to as a flow key node.

In order to address the decentralized service composition model, two types of service composition routing algorithms are proposed: simple broadcasting service composition and behavior evolution service composition. For simplicity, it will be assumed in the following description of both routing algorithms that service composition occurs at an interval of 1 hop. However, it can be easily understood by those skilled in the art that the present invention is also applicable when service composition occurs at an interval of k hops.

Figure 4:
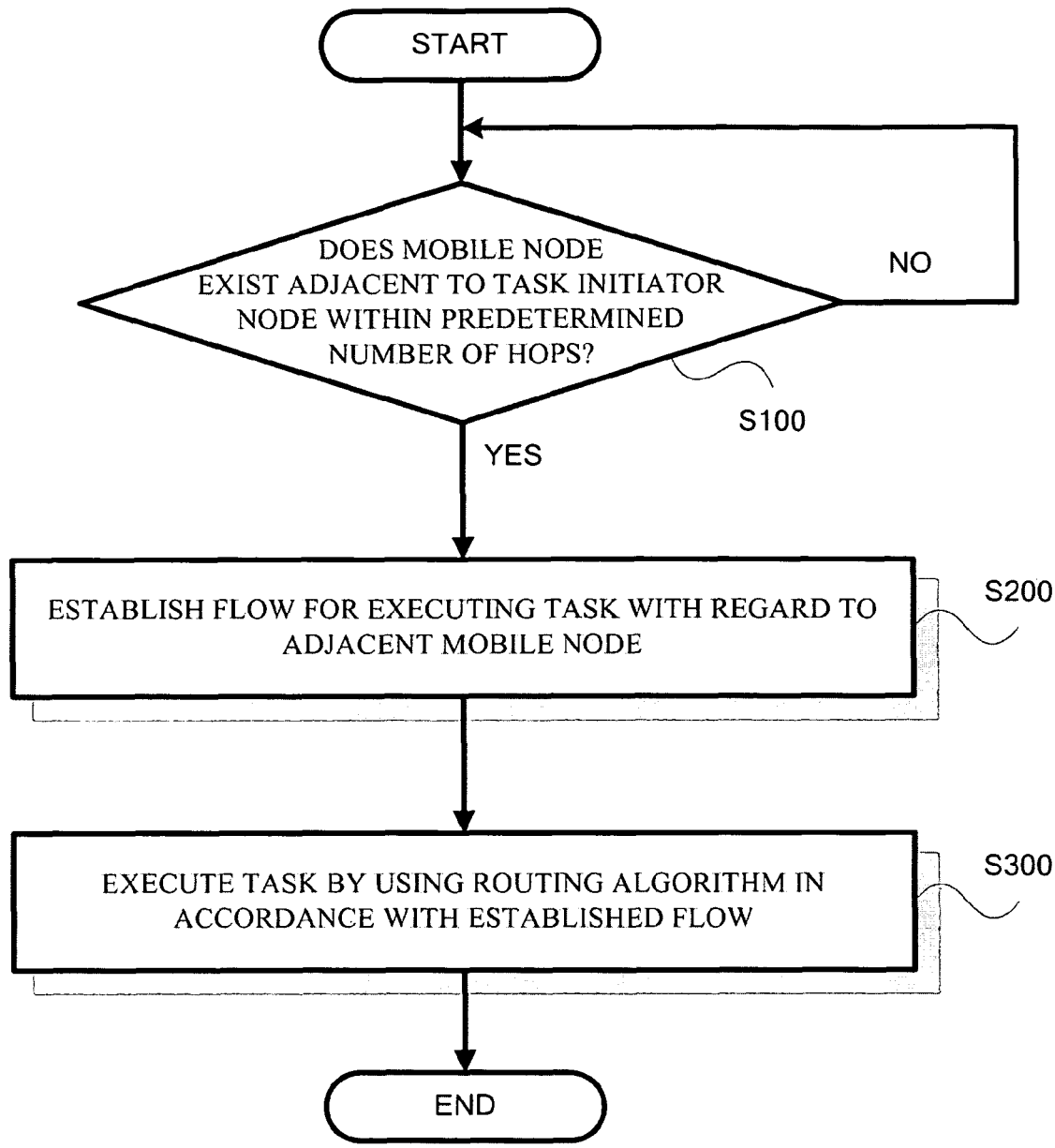
FIG. 4 is a flowchart showing a method for providing a distributed service composition model for an ad hoc network according to an exemplary embodiment of the present invention.

FIG. 4 is a flowchart which shows a method for providing a distributed service composition model for an ad hoc network according to an exemplary embodiment of the present invention.

In order to execute a task requested by a user in an ad hoc network consisting of n mobile nodes, a task initiator node determines whether an adjacent mobile node exists within a predetermined number of hops from itself (S100). When it is determined that an adjacent mobile node exists, the task initiator node establishes a flow for executing the task with regard to the adjacent mobile node (S200). The task initiator node executes the task in accordance with the established flow by using a routing algorithm (S300). At least one service necessary to execute the task, as well as the execution order between the services, is determined based on cooperation between adjacent mobile nodes. The routing algorithm refers to either the simple broadcasting service composition or the behavior evolution service composition.

The simple broadcasting service composition algorithm consists of two mechanisms: a flow discovery process and a fault recovery process. The flow discovery process is for the purpose of discovering services necessary to complete the task and determine the order of services. The fault recovery process is for the purpose of recovering from faults, which occur when the task is executed, by monitoring its execution.

Figure 5:
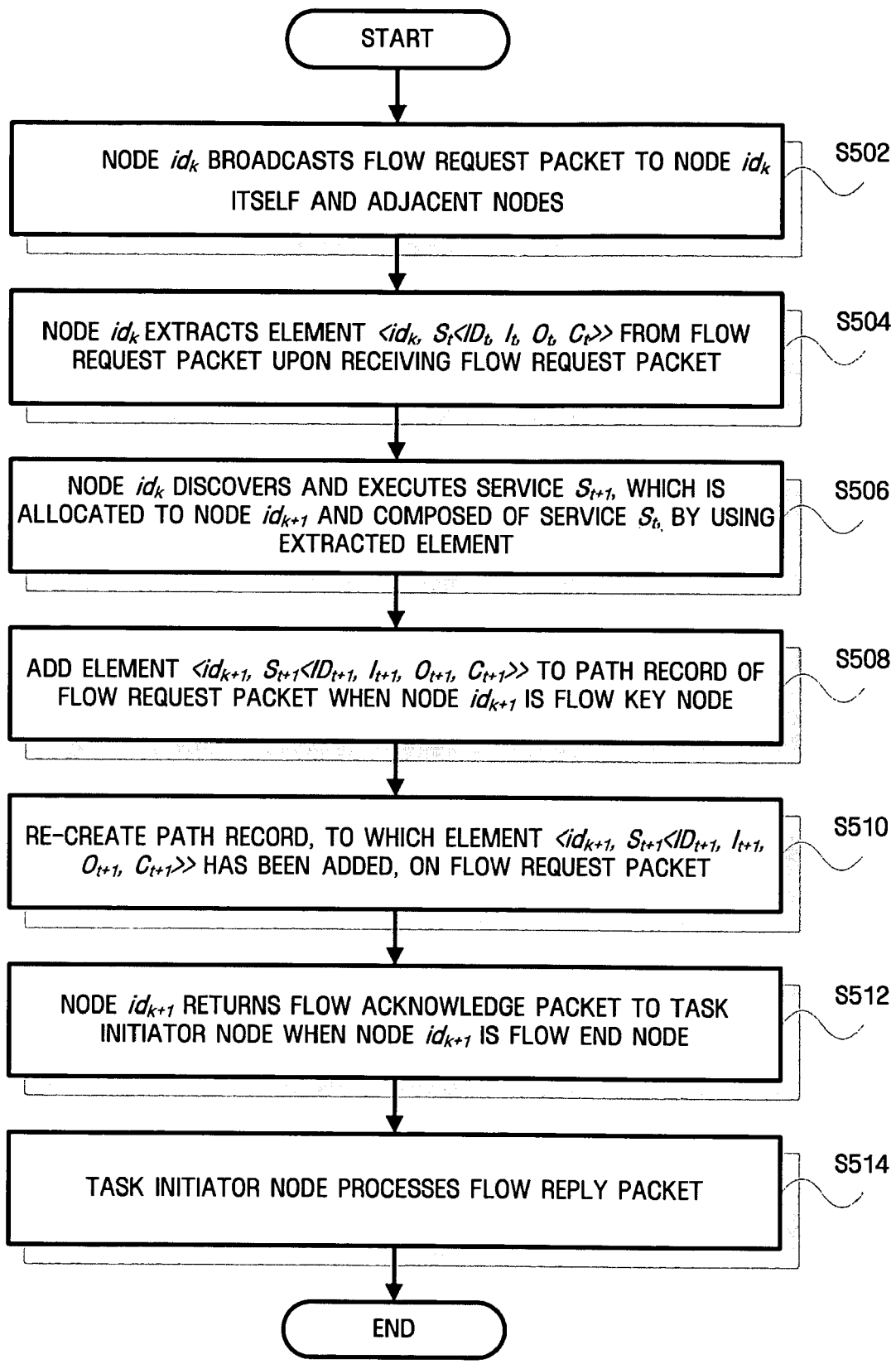
FIG. 5 is a flowchart showing a flow fining process according to an exemplary embodiment of the present invention.

The flow discovery process of the simple broadcasting service composition algorithm will now be described with reference to FIG. 5.

A mobile node begins to execute a task t<tid, I(i), 0> at a time $T_l$ and broadcasts a flow request packet to itself and adjacent nodes (S502). The packet contains a path record, as well as information regarding the task, including its ID, input and output patterns, and initiation time. The path record accumulates a sequence of $<id_k, S_t<ID_t, I_t, O_t, C_t>>$ regarding a path along which the packet propagates via an ad hoc network during the flow discovery process. In order to prevent the flow from cycling, each mobile node executes only one task based on a single service and, in this case, the mobile node holds a list having a format of a pair <task id, service id>.

When the $(k+1)^{th}$ mobile node, $id_{k+1}$ receives the flow request packet, it is processed in the following manner.

If the task has already been executed, the packet is ignored, and no other process needs to be performed. If not, the node $id_{k+1}$, which has received the flow request packet, extracts a finally recorded element $<id_k, S_t<ID_t, I_t, O_t, C_t>>$ from the path record of the flow request packet (S504). The node $id_{k+1}$ then attempts to discover a service $S_{t+1}$ allocated thereto (S506). The service $S_{t+1}$ includes a service $S_t$ of a previous time. If one of the services $S_{t+1}$ and $S_t$ does not exist, the flow request packet is ignored, and the process is terminated.

Even when the services $S_t$ and $S_{t+1}$ are completely or partially composed, the packet may still be ignored as long as a pair <tid, $S_{t+1}<ID_{T+1}>>$ is enumerated in the list of a pair <task id, service id> of the node $id_{k+1}$.

When the services $S_t$ and $S_{t+1}$ are completely composed, an element $<id_{k+1}, S_{t+1}<ID_{t+1}, I_{t+1}, O_{t+1}, C_{t+1}>>$ is added to the path record existing in the packet.

When the services $S_t$ and $S_{t+1}$ are partially composed, the node $id_{k+1}$ must receive other flow request packets after a period of time. Then, the combination of last services in respective path records is completely composed together with the service $S_{t+1}$. After the period of time is over, the flow request packet may be ignored. When $<id_{k+1}, S_{t+1}<ID_{T+1}>>$ corresponds to the flow key node, $<id_{k+1}, S_{t+1}<ID_{t+1}, I_{t+1}, O_{t+1}, C_{t+1}>>$ must be added to the path record of each packet (S508). Then, a path record which contains the element $<id_{k+1}, S_{t+1}<ID_{t+1}, I_{t+1}, O_{t+1}, C_{t+1}>>$ is re-created in the flow request packet (S510). As such, the service $S_{t+1}$ can be completely composed together with another service (or a plurality of services).

When the output pattern $O_{t+1}$ of the service $S_{t+1}$ includes an intended output pattern O, i.e. when the element $<id_{k+1}, S_{t+1}<ID_{t+1}, I_{t+1}, O_{t+1}, C_{t+1}>>$ becomes the flow end node and paths for executing the task have been discovered successfully, a flow reply packet is returned to the task initiator node (S512), which then processes the flow reply packet (S514).

The flow reply packet includes a total of six fields: unique flow ID (fid), task ID (tid), current path record, current position based on path record, list of collected paths, and maximum number of possible paths. The list of collected paths is initialized together with the current path record, and the maximum number of possible paths is initialized to 1. In order to obtain every path regarding the flow, the task initiator node holds a list of collected paths regarding each possible flow. Upon receiving the flow reply packet, the mobile node $id_{k+1}$ processes it through a predetermined process, which will now be described in detail.

When the current position of the packet is $<id_{k+1}, S_p<ID_p>>$, elements of the current path record are tracked in the opposite direction.

If the node $id_{k+1}$ can discover an element $<id_k, S_t<ID_t, I_t, O_t, C_t>>$ and if the node $id_k$ and the node $id_{k+1}$ are different mobile nodes, the current position is fixed at the element $<id_k, S_t<ID_t, I_t, O_t, C_t>>$, and the flow reply packet is sent to the node $id_k$. If not, $<id_{k+1}, S_{t+1}<<ID_{t+1}>>$ is regarded as a flow initiation node or flow key node. If the element $<id_{k+1}, S_{t+1}<<ID_{t+1}>>$ is a flow key node and if the node $id_{k+1}$ has information regarding the list of path records $<tid, S_{t+1}<ID_{t+1}>>$, which are temporarily stored while the flow request packet is transmitted, the number of the path records must be added to the maximum number of possible paths. A new flow reply packet is re-created for each path, and the current path record of the re-created packet is registered as a new path record. The list of collected paths is then updated, and the flow reply packet is processed again.

If the $<id_{k+1}, S_{t+1}<<ID_{t+1}>>$ is a flow initiation node, the list of collected paths, which is recorded on the packet, is added to the list of received paths regarding the flow ID (fid), which is held by the node $id_{k+1}$, and redundant paths are removed. If the number of received paths is identical with the maximum number of possible paths, every path which executes the task ID (tid) can reach everywhere while the flow reply packet is transmitted.

The fault recovery process of the simple broadcasting service composition algorithm, which follows the flow discovery process, will now be described with reference to FIG. 6.

Wireless ad hoc networks are less stable than wired networks, due to the mobility of nodes, and there is also a possibility that the network connection may be broken. A task initiator monitors a task execution process and, in order to recover from faults which occur in the process, two types of fault recovery mechanisms are employed. The simplest solution is to replace the faulty flow with another one or to restart the task in the faulty flow. However, this approach is inefficient because faults are very likely to occur again.

Figure 6:
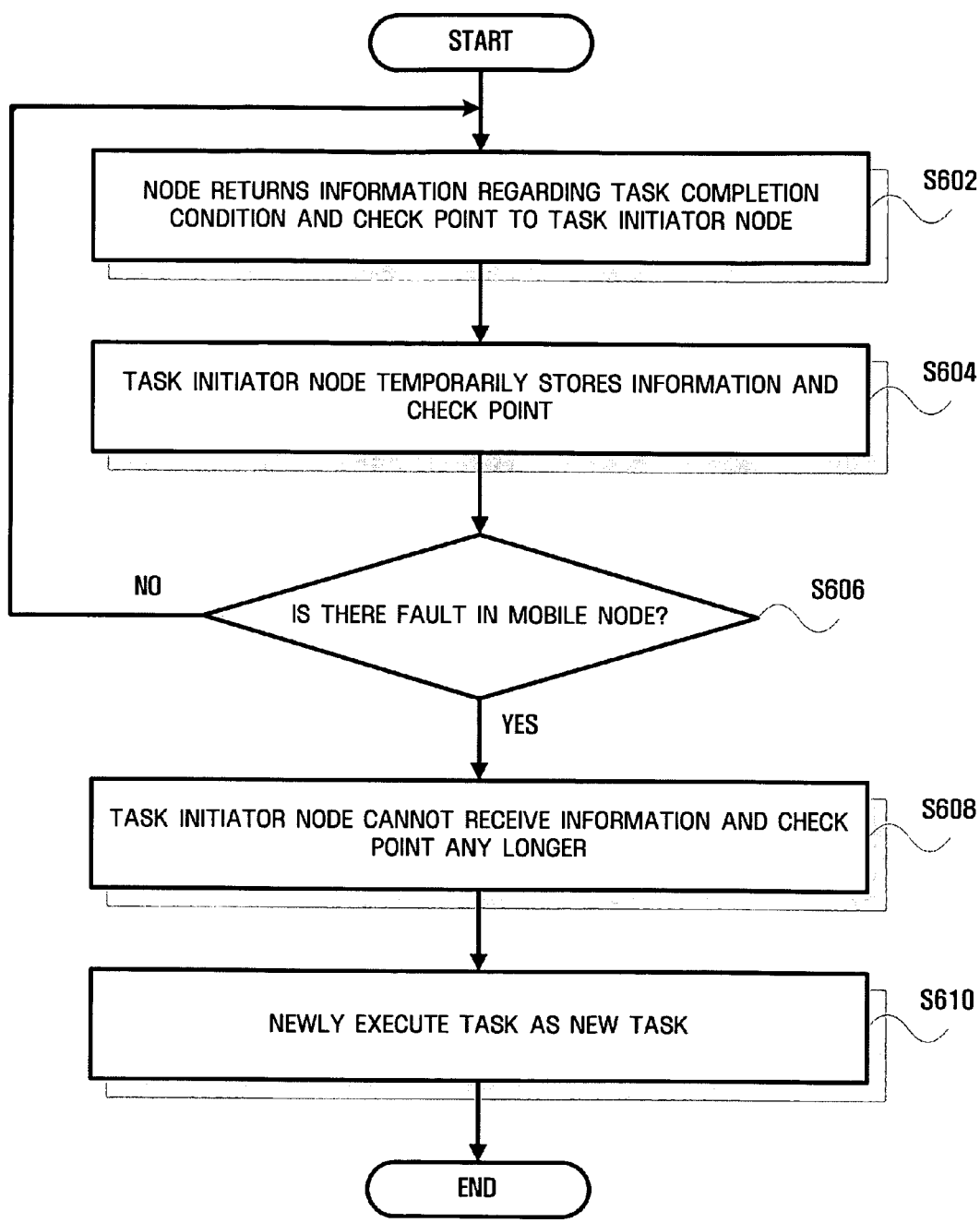
FIG. 6 is a flowchart showing a fault recovery process according to an exemplary embodiment of the present invention.

A more efficient solution is given in FIG. 6. After the flow node completes its sub-task, it transmits information regarding completion of the sub-task and its check point to the task initiator node again (S602). The task initiator node then temporarily stores the transmitted information and the check point (S604). The task initiator node determines whether the flow node causes faults (S606). If faults occur, the task initiator node cannot receive the check point any longer (S608). The task, which has remained unsolved, is reconstructed and is newly executed as a new task (S610).

The above-mentioned broadcasting approaches cause much overhead. A behavior evolution service composition algorithm is newly proposed in an attempt to reduce the overhead. This algorithm utilizes experiences which result from past service composition processes. Particularly, each flow node attempts to select many services from services of adjacent nodes. As used herein, behavior refers to selection of services which constitute the flow nodes, and evolution refers to gradual increase in efficiency of the selection process as experiences accumulate.

The behavior evolution service composition algorithm consists of two processes: a rule acquirement process and a rule utilization process.

In the course of executing a task, each mobile node in a network acquires experiences, which are expressed as rules. In order to create a rule regarding a flow node, an output pattern of a flow node, which is within reach from the current flow node, is supposed to exist. In order to acquire the output pattern O, the service $S_t$ must be composed of $\{S_{t+1}\}$. This can be briefly expressed in the following manner.

$$S_t: \text{IF O THEN } \{S_{t+1}(ID_{t+1})\}$$

Assume that a rule r is created by a node $id_k$: if the rule r is absent from the node $id_k$, the unit of rule measurement, i.e. confidence, is set as 1 and, if not, the confidence is increased by 1.

Figure 7:
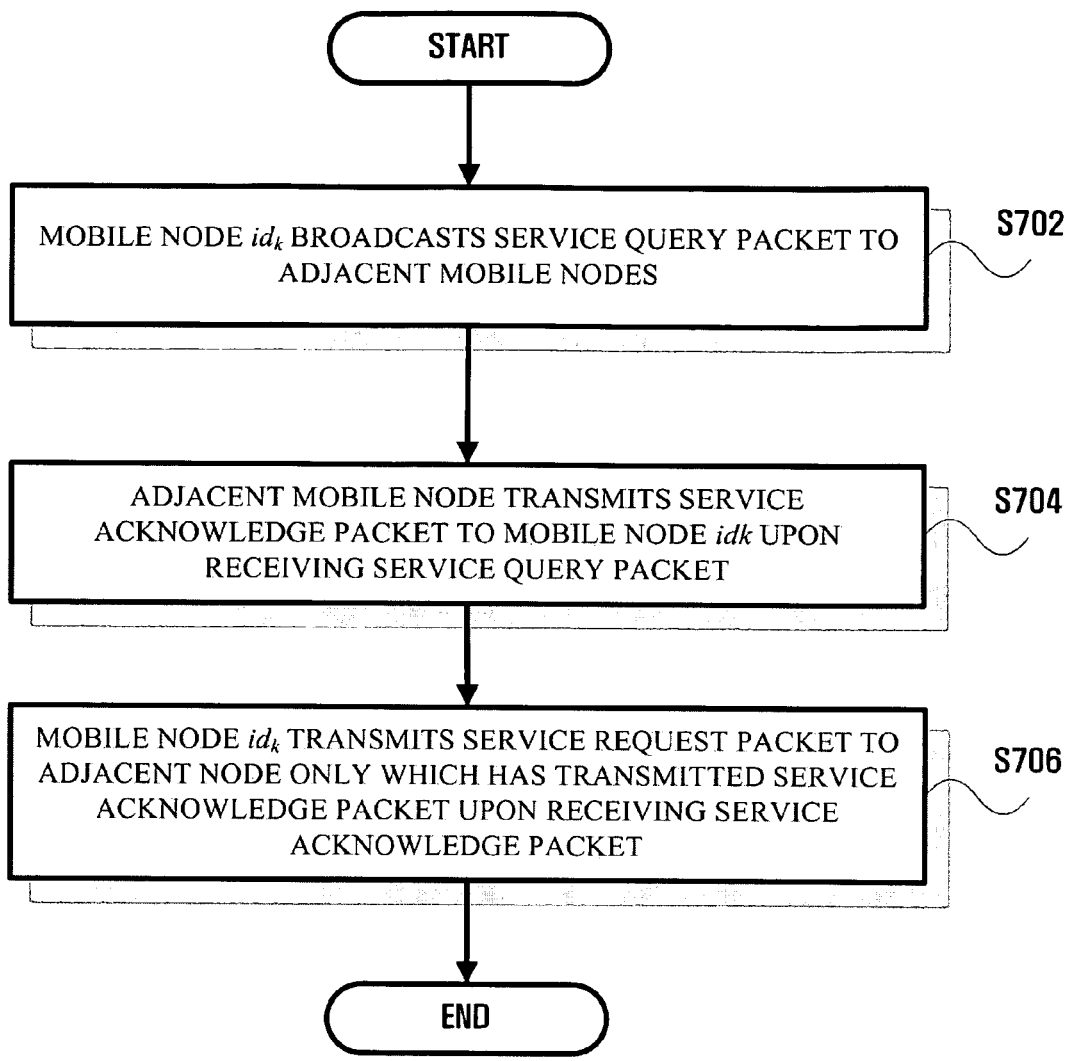
FIG. 7 is a flowchart showing a rule utilization process according to an exemplary embodiment of the present invention.

The rule acquirement process for acquiring a rule is followed by a rule utilization process for utilizing the acquired rule, which will now be described with reference to FIG. 7.

The mobile node $id_k$ does not broadcast a flow request packet to its neighbors, but transmits the flow request packet to selected adjacent nodes. In order to select and determine adjacent nodes, to which the flow request packet is to be transmitted, the mobile node broadcasts a service query packet which includes $<tid, id_k, S_t<ID_t, O_t>>$ (S702). If an adjacent mobile node $id_{k+1}$ includes a service $S_{t+1}$, which may be composed of a service $S_t$, the node $id_{k+1}$ returns a service acknowledge packet to the node $id_k$ (S704). The service acknowledge packet includes $<id_{k+1}, S_{t+1}<ID_{t+1}, O_{t+1}, C_{t+1}>, M>$, wherein M refers to a parameter which indicates whether the node $id_k$ and the node $id_{k+1}$ are completely composed of each other. After a period of time, the node $id_k$, which has received the service acknowledge packet, transmits a service request packet solely to adjacent nodes, which have sent the service acknowledge packet (S706). If the output pattern of the service corresponds to a superior set of a desired output pattern O, one service may be selected. The accumulated rules may be used to select a service from remaining services.

Three assumptions will now be made.

Firstly, there are m services. Secondly, the node $id_k$ has accumulated k special rules, each of which has a preceding condition O (task's output pattern) and a following condition belonging to the m services. The k rules are expressed by confidence $r_1$-$r_k$, which corresponds to confidence $b_1$-$b_k$. Thirdly, there are $m_1$ services conforming to all following conditions of the k rules, as well as $m_2$ ($m_2$=m-$m_1$) services not conforming thereto.

Based on these rules, $u_1$ rules must be selected from the k rules together with services corresponding to the $u_1$ rules. In addition, $u_2$ services must be selected from the $m_2$ services under consideration of the confidence of the rules and the cost for executing the services. The selection process will now be described.

If $k \leq u_1$, a total of k rules must be used and, if $m_2 \leq u_2$, a total of $m_2$ services must be used. However, if $k > u_1$ or $m_2 > u_2$, services must be selected based on probabilities. Particularly, if a condition "IF O THEN $\{S_{t_1}, S_{t_2}, K, S_{t_l}\}$" is satisfied for each rule $r_t$ and if the rule $r_t$ has a weight $w_t$ defined as $b_t/\Sigma_{j=1}^{l} S_{t_j}(C_{t_j})$, the probability that services $\{S_{t_1}, S_{t_2}, K, S_{t_l}\}$ will be selected becomes $w_t/\Sigma_{i=1}^{k} w_i$. The probability that the $S_t$ will be selected from $m_2$ services is $(1/S_t(C_t))/\Sigma_{j=1}^{m_2}(1/S_j(C_j))$.

Figure 8:
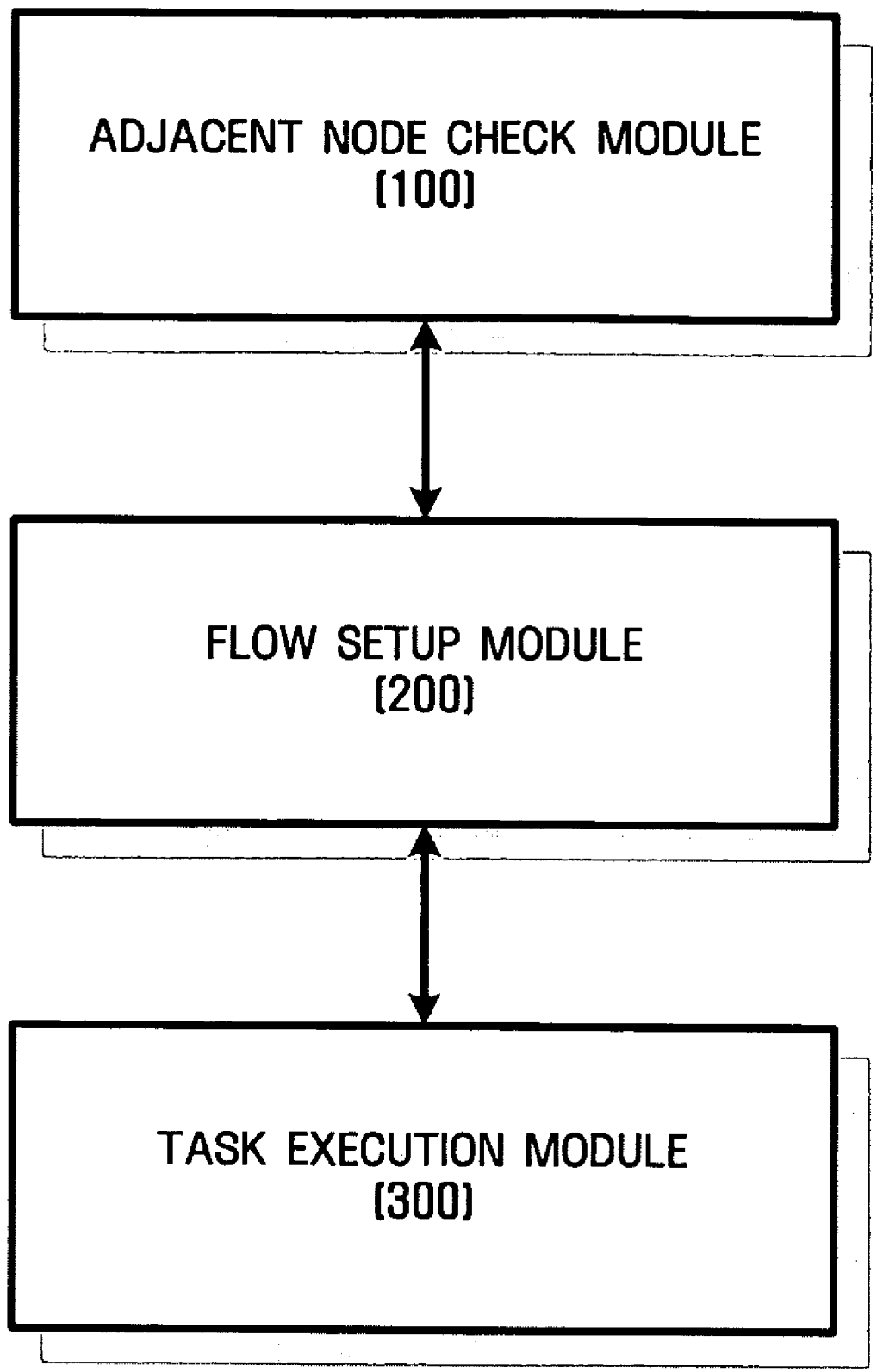
FIG. 8 shows the construction of an apparatus for providing a distributed service composition model for an ad hoc network according to an exemplary embodiment of the present invention.

FIG. 8 shows the construction of an apparatus for providing a distributed service composition model for an ad hoc network according to an exemplary embodiment of the present invention.

In order to execute a task at a user's request by a service composition apparatus in an ad hoc network consisting of n mobile nodes, an adjacent node check module 100 checks the existence of a mobile node within a number of hops from a task initiator node.

A flow setup module 200 establishes a flow for executing the task with regard to an adjacent mobile node, the existence of which has been confirmed as a result of the checking.

A task execution module 300 executes the task by using a routing algorithm in accordance with the established flow.

The term "module" (or "unit" or "table"), as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, components and modules may be implemented so as to regenerate one or more CPUs inside a device.

It can be easily understood by those skilled in the art that the inventive method can be recorded on a computer-readable recording medium as a program code to be run on a computer without departing from the scope of the exemplary embodiments of the present invention.

As mentioned above, the exemplary embodiments of the present invention can execute tasks and provide services based on cooperation between mobile nodes, which are distributed in accordance with the characteristics of distributed environments of ad hoc networks. The inventive service composition model in an ad hoc network has the following advantages.

Firstly, users are provided with more services than services owned by their mobile nodes. In addition, new services may be created.

Secondly, users need not understand how to complete the task of their mobile nodes, because the task can be completed based on cooperation between respective mobile nodes.

Thirdly, all that are necessary to complete the task are input instances and output patterns.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of providing a distributed service composition model for service composition in an ad hoc network comprising a plurality of mobile networks, the method comprising:
confirming whether an adjacent mobile node exists within a number of hops from a task initiator node so as to execute a task;
establishing a flow for executing the task with regard to the adjacent mobile node if it is confirmed that the adjacent mobile node exists; and
executing the task using a routing algorithm in accordance with the flow, wherein at least one service necessary to execute the task and an execution order between services are determined based on cooperation between adjacent mobile nodes, and
wherein the routing algorithm comprises:
the adjacent mobile node receiving a flow request packet broadcasted by the task initiator node;
a single mobile node of the adjacent mobile nodes determining whether at least one service allocated to the single mobile node exists in the flow request packet, wherein the at least one service is a part of a rule necessary to execute the task;
the single mobile node executing the at least one service if the single mobile node determines that the at least one service allocated to the single mobile node exists in the flow request packet; and
the single mobile node returning a result of executing the at least one service to the task initiator node,
wherein the routing algorithm comprises a flow discovery process for discovering the flow determining at least one service necessary to execute the task and the execution order between services and a fault recovery process for recovering from faults occurring while the task is executed,
wherein the flow discovery process is executed based on a directed acyclic graph which starts from a flow start node for receiving an input of service data necessary to execute the task, leads through a flow key node for receiving an input of the service data from at least two mobile nodes, and ends at a flow end node for creating an output suitable for an output pattern of the task,
wherein the flow discovery process comprises:
broadcasting a flow request packet to the task initiator node and the adjacent mobile nodes by the task initiator node if the task initiator node is a $k^{th}$ mobile node $id_k$;
extracting an element, $<id_k, S_t<ID_t, I_t, O_t, C_t>>$, from the flow request packet by a $(k+1)^{th}$ mobile node $id_k+1$ which received the flow request packet;
discovering and executing a service $S_t+1$ based on the element extracted by the mobile node $id_k+1$, the service $S_t+1$ being composed of a service $S_t$ and allocated to the mobile node $id_k+1$; and
ignoring the flow request packet if one of the service $S_t+1$ and the service $S_t$ does not exist,
wherein the $ID_t$ refers to a unique identifier (ID) of the service $S_t$, the $I_t$ refers to an input pattern of the service $S_t$, the $O_t$ refers to an output pattern of the service $S_t$, and the $C_t$ refers to cost necessary to execute the service $S_t$,
wherein the flow request packet comprises a path record for recording a path between mobile nodes, information regarding the task, an ID of the task, input and output patterns of the mobile nodes, and information regarding task initiation time, and
wherein the method further comprises:
adding a $(k+1)^{th}$ element $<id_k+1, S_t+1<ID_t+1, I_t+1, O_t+1, C_t+1>>$ to the path record existing in the flow request packet, if the services $S_t$ and $S_t+1$ are completely composed; and
receiving a different flow reqsuest packet after a period of time by the node $id_k+1$, if the services $S_t$ and $S_t+1$ are partially composed, so that a last service existing on the path record is completely composed together with the service $S_t+1$.

2. The method of claim 1, wherein the flow start node, the flow key node, and the flow end node are defined by a pair <node name, service name> in which the node name refers to an ID of respective nodes, and the service name refers to a name of services allocated to the nodes.

3. The method of claim 1, further comprising ignoring the flow request packet if a second element <tid, $S_t+1<ID_t+1>>$ already exists on a list, the mobile node $id_k+1$ having the list, the second element being a pair of the task and a service necessary to execute the task.

4. The method of claim 1, wherein the fault recovery process comprises:
   returning information regarding a task completion condition and a check point to the task initiator node by a mobile node if the mobile node executes a part of a task allocated to the mobile node;
   temporarily storing the information and the check point in the task initiator node; and
   newly executing the task as a new task if the task initiator node cannot receive the information and the check point any longer due to a fault in the mobile node.

5. The method of claim 1, wherein the routing algorithm comprises a rule acquirement process for acquiring a rule which indicates experiences obtained while the adjacent mobile node executes the task and a rule utilization process for utilizing the rule.

6. The method of claim 5, wherein, in the rule acquirement process, a confidence is set as 1 if the rule does not exist in the adjacent mobile node while the rule is created by the adjacent mobile node, and the confidence is increased by 1 if the rule exists in the adjacent mobile node, the confidence being a unit of a rule measurement.

7. The method of claim 5, wherein the rule utilization process comprises:
   broadcasting a service query packet to adjacent nodes of a $k^{th}$ mobile node $id_k$ by the $k^{th}$ mobile node $id_k$, the service query packet containing an element <tid, $id_k$, $S_t<ID_t, O_t>>$;
   transmitting a service acknowledge packet to the $k^{th}$ mobile node $id_k$ if a service has been allocated to the adjacent mobile node which received the service query packet; and
   transmitting a service request packet to only the adjacent mobile node by the $k^{th}$ mobile node $id_k$ which received the service acknowledge packet,
   wherein the service acknowledgement packet is transmitted by the adjacent mobile node.

8. The method of claim 7, wherein the service acknowledge packet comprises an element <$id_k+1$, $S_t+1<ID_t+1$, $O_t+1$, $C_t+1>$, M>, the M being a parameter which indicates whether the node $id_k$ and the node $id_k+1$ are completely composed.

9. A method of providing a distributed service composition model for service composition in an ad hoc network comprising a plurality of mobile networks, the method comprising:
   confirming whether an adjacent mobile node exists within a number of hops from a task initiator node so as to execute a task;
   establishing a flow for executing the task with regard to the adjacent mobile node if it is confirmed that the adjacent mobile node exists; and
   executing the task using a routing algorithm in accordance with the flow, wherein at least one service necessary to execute the task and an execution order between services are determined based on cooperation between adjacent mobile nodes, and
   wherein the routing algorithm comprises:
   the adjacent mobile node receiving a flow request packet broadcasted by the task initiator node;
   a single mobile node of the adjacent mobile nodes determining whether at least one service allocated to the single mobile node exists in the flow request packet, wherein the at least one service is a part of a rule necessary to execute the task;
   the single mobile node executing the at least one service if the single mobile node determines that the at least one service allocated to the single mobile node exists in the flow request packet; and
   the single mobile node returning a result of executing the at least one service to the task initiator node,
   wherein the routing algorithm comprises a flow discovery process for discovering the flow determining at least one service necessary to execute the task and the execution order between services and a fault recovery process for recovering from faults occurring while the task is executed,
   wherein the flow discovery process is executed based on a directed acyclic graph which starts from a flow start node for receiving an input of service data necessary to execute the task, leads through a flow key node for receiving an input of the service data from at least two mobile nodes, and ends at a flow end node for creating an output suitable for an output pattern of the task,
   wherein the flow discovery process comprises:
   broadcasting a flow request packet to the task initiator node and the adjacent mobile nodes by the task initiator node if the task initiator node is a $k^{th}$ mobile node $id_k$;
   extracting an element, <$id_k$, $S_t<ID_t, I_t, O_t, C_t>>$, from the flow request packet by a $(k+1)^{th}$ mobile node $id_k+1$ which received the flow request packet;
   discovering and executing a service $S_t+1$ based on the element extracted by the mobile node $id_k+1$, the service $S_t+1$ being composed of a service $S_t$ and allocated to the mobile node $id_k+1$; and
   ignoring the flow request packet if one of the service $S_t+1$ and the service $S_t$ does not exist,
   wherein the $ID_t$ refers to a unique identifier (ID) of the service $S_t$, the $I_t$ refers to an input pattern of the service $S_t$, the $O_t$, refers to an output pattern of the service $S_t$, and the $C_t$ refers to cost necessary to execute the service $S_t$,
   wherein the flow request packet comprises a path record for recording a path between mobile nodes, information regarding the task, an ID of the task, input and output patterns of the mobile nodes, and information regarding task initiation time, further comprising:
   adding a $(k+1)^{th}$ element <$id_k+1$, $S_t+1<ID_t+1$, $I_t+1$, $O_t+1$, $C_t+1>>$ to the path record of the flow request packet so as to be stored on a list of the path record, if the mobile node $id_k+1$ is the flow key node; and
   re-creating a path record on the flow request packet, the $(k+1)^{th}$ element <$id_k+1$, $S_t+1<ID_t+1$, $I_t+1$, $O_t+1$, $C_t+1$ >> having been added to the path record.

10. The method of claim 9, further comprising:
   returning a flow reply packet to the task initiator node by the mobile node $id_k+1$ if the output pattern $O_t+1$ of the service $S_t+1$ contains an output pattern O so that the mobile node $id_k+1$ becomes the flow end node; and
   executing a flow reply node by the task initiator node.

11. The method of claim 10, wherein a field of the flow reply packet comprises a flow id fid, a task id tid, a current path record, a current position based on the path record, a list of collected paths, and a maximum number of possible paths, wherein the list of collected paths are initialized together with the current path record and wherein the maximum number of possible paths are initialized to 1.

12. An apparatus for providing a distributed service composition model for service composition in an ad hoc network which has n mobile networks, the apparatus comprising:
- an adjacent node check module which confirms whether an adjacent mobile node exists within a number of hops from a task initiator node so as to execute a task;
- a flow setup module which establishes a flow for executing the task with regard to the adjacent mobile node if it is confirmed that the adjacent mobile node exists; and
- a task execution module which executes the task using a routing algorithm in accordance with the flow, wherein at least one service necessary to execute the task and an execution order between services are determined based on cooperation between adjacent mobile nodes, and wherein the routing algorithm comprises:
- a single mobile node of the adjacent mobile nodes, receiving a flow request packet broadcasted by the task initiator node;
- the single mobile node determining whether at least one service allocated to the single mobile node exists in the flow request packet, wherein the at least one service is a part of a rule necessary to execute the task;
- the single mobile node executing the at least one service if it is determined that the at least one service allocated to the single mobile node exists in the flow request packet; and
- the single mobile node returning a result of executing the at least one service to the task initiator node, wherein the routing algorithm comprises a flow discovery process for discovering a flow determining at least one service necessary to execute the task and the execution order between services and a fault recovery process for recovering from faults occurring while the task is executed, wherein the flow discovery process is executed based on a directed acyclic graph which starts from a flow start node which receives an input of service data necessary to execute the task, leads through a flow key node which receives an input of the service data from at least two mobile nodes, and ends at a flow end node which creates an output suitable for an output pattern of the task, wherein the flow request packet comprises a path record which records a path between mobile nodes, information regarding the task, an ID of the task, input and output patterns of the mobile nodes, and information regarding task initiation time, wherein the task execution module further:
- broadcasts a flow request packet to the task initiator node and the adjacent mobile nodes by the task initiator node if the task initiator node is a $k^{th}$ mobile node $id_k$; extracts an element, $<id_k,S_t,<ID_t,I_t, O_t,C_t>>$, from the flow request packet by a $(k+1)^{th}$ mobile node $id_k+1$ which received the flow request packet;
- discovers and executes a service $S_t+1$ based on the element extracted by the mobile node $id_k+1$, the service $S_t+1$ being composed of a service $S_t$ and allocated to the mobile node $id_k+1$;
- ignores the flow request packet if one of the service $S_t+1$ and the service $S_t$ does not exist,
- adds a $(k+1)^{th}$ element $<id_k+1, S_t+1<ID_t+1,I_t+1, O_t+1, C_t+1>>$ to the path record existing in the flow request packet, if the services $S_t$ and $S_t+1$ are completely composed; and
- receives a different flow request packet after a period of time by the node $id_k+1$, if the services $S_t$ and $S_t+1$ are partially composed, so that a last service existing on the path record is completely composed together with the service $S_t+1$ and wherein the $ID_t$ refers to a unique identifier (ID) of the service $S_t$, the $I_t$ refers to an input pattern of the service $S_t$, the $O_t$ refers to an output pattern of the service $S_t$, and the $C_t$ refers to cost necessary to execute the service $S_t$.

13. The apparatus of claim 12, wherein, in the fault recovery process, a mobile node returns information regarding a task completion condition and a check point to the task initiator node if the mobile node executes a part of a task allocated to the mobile node, the task initiator node temporarily stores the information and the check point, and the task is newly executed as a new task if the task initiator node cannot receive the information and the check point any longer due to a fault in the mobile node.

14. The apparatus of claim 12, wherein the routing algorithm comprises a rule acquirement process for acquiring a rule which indicates experiences obtained while the mobile node executes the task and a rule utilization process for utilizing the rule.

* * * * *